Feb. 19, 1963 F. L. IRISH 3,078,009
PALLET DISPENSER
Filed Dec. 6, 1960 3 Sheets-Sheet 1
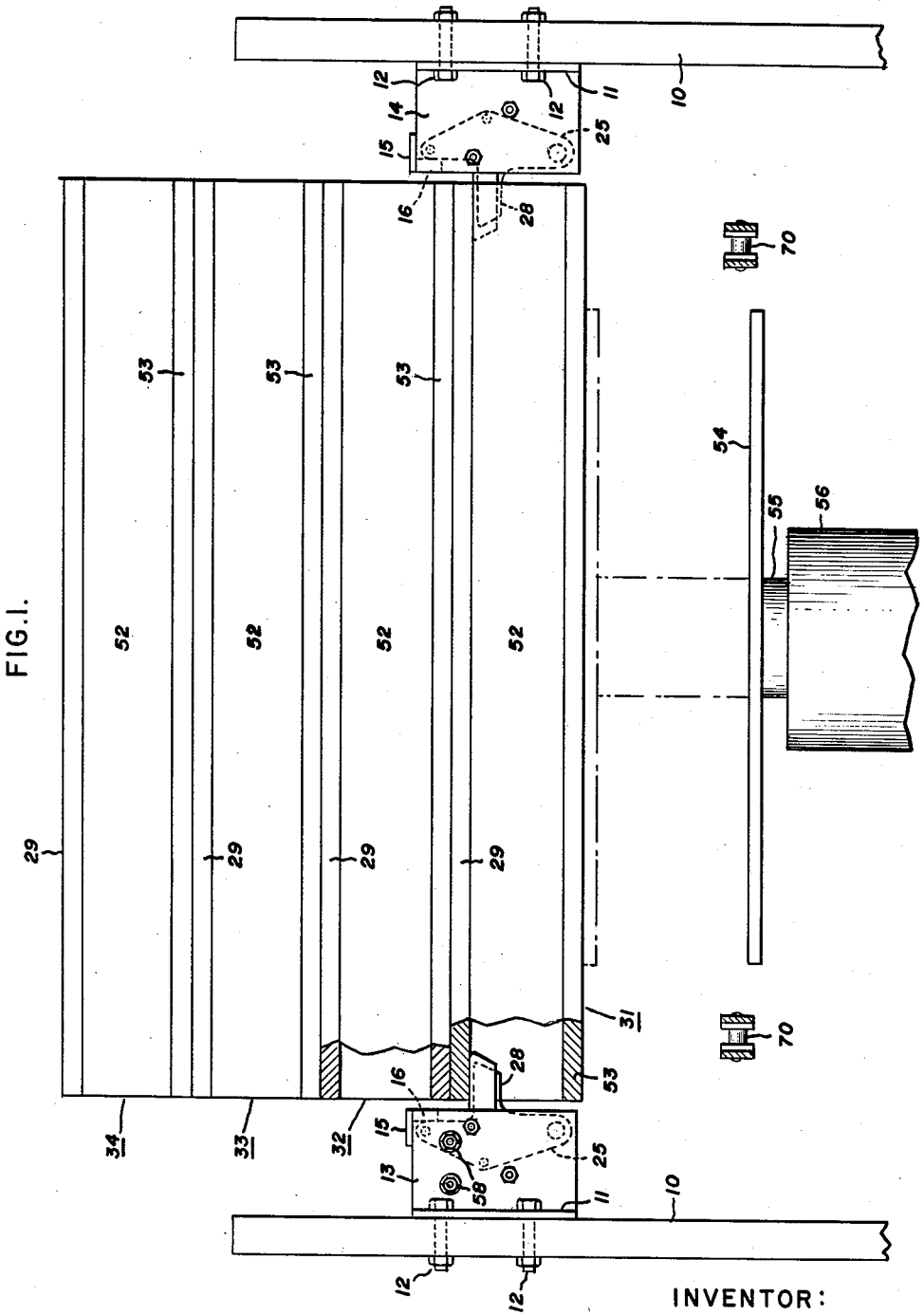
INVENTOR:
FRANK L. IRISH,
BY *D. Emmett Thompson*
HIS ATTORNEY.

Feb. 19, 1963  F. L. IRISH  3,078,009
PALLET DISPENSER
Filed Dec. 6, 1960  3 Sheets-Sheet 2
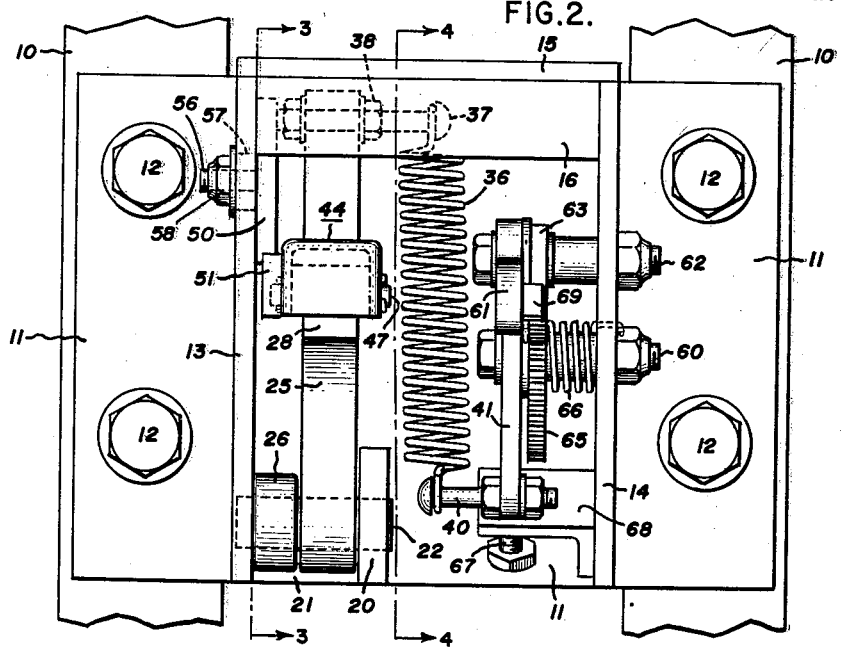
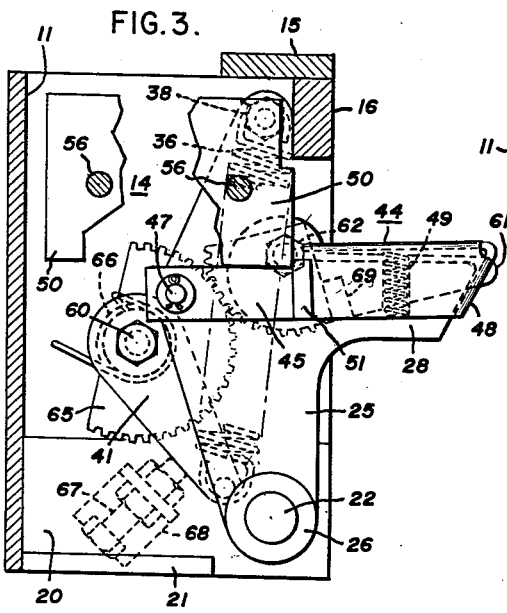
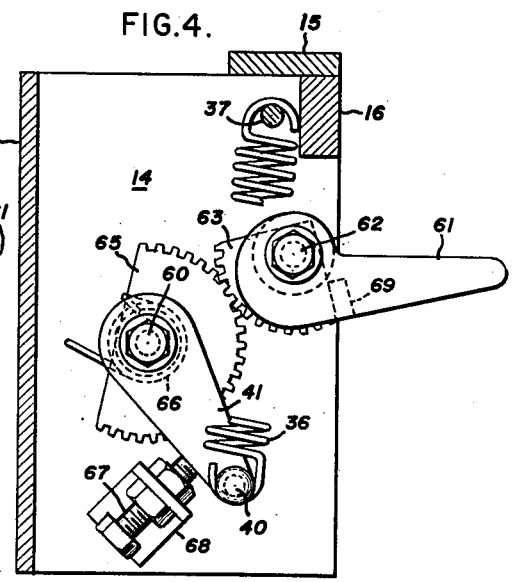
INVENTOR:
FRANK L. IRISH,
BY *D. Emmett Thompson*
HIS ATTORNEY.

Feb. 19, 1963 F. L. IRISH 3,078,009
PALLET DISPENSER
Filed Dec. 6, 1960 3 Sheets-Sheet 3
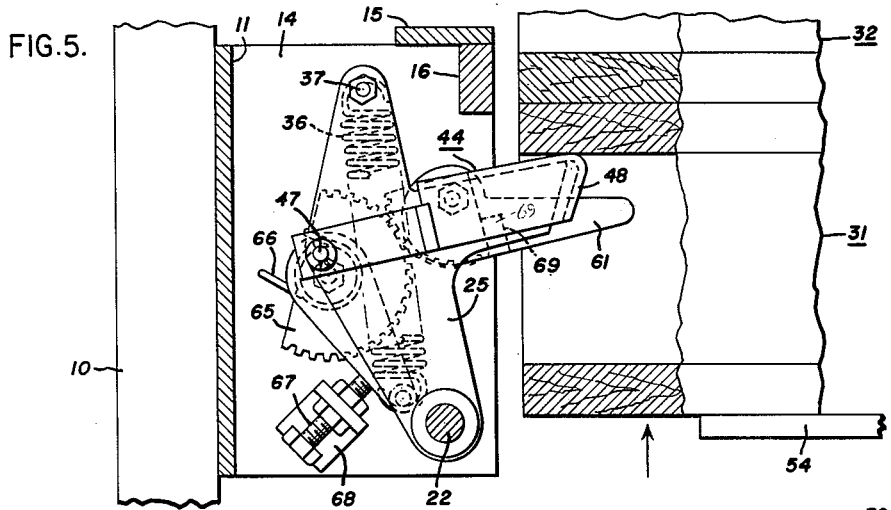
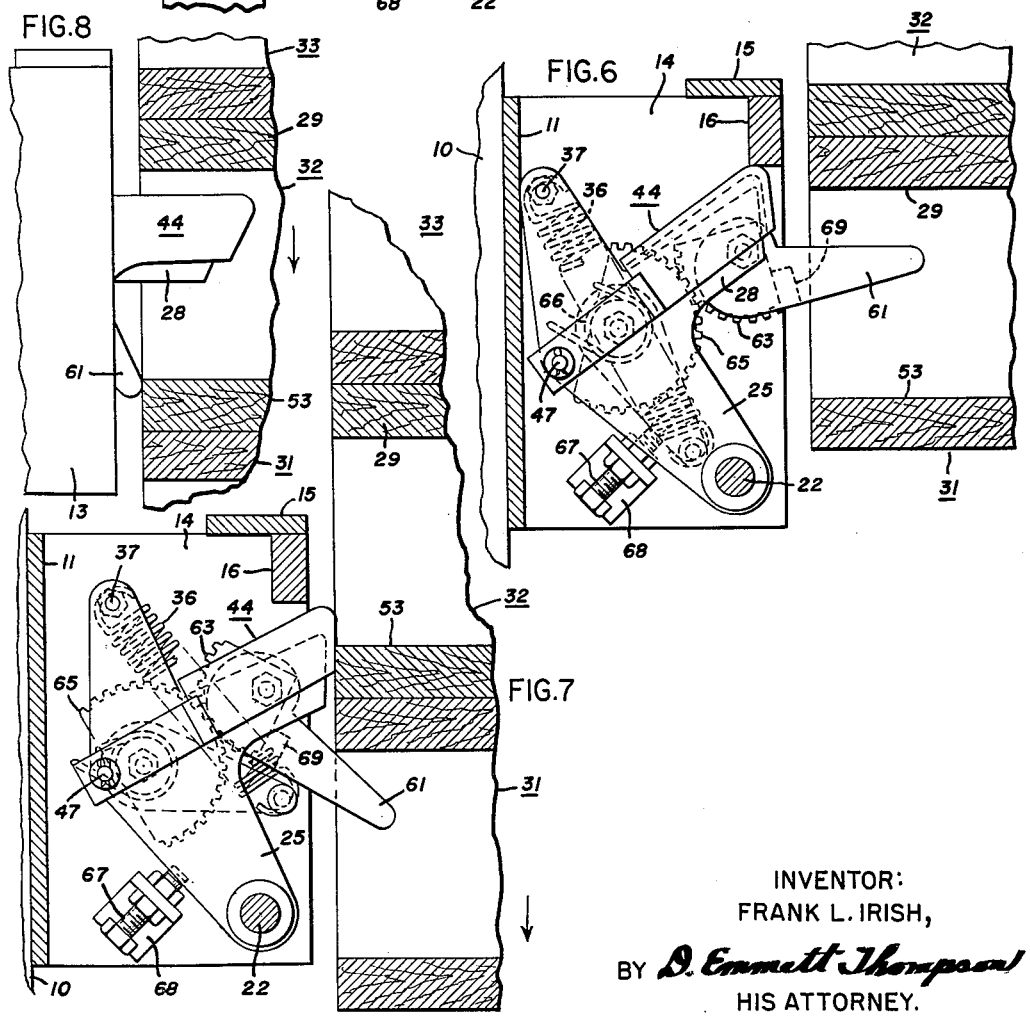
INVENTOR:
FRANK L. IRISH,
BY D. Emmett Thompson
HIS ATTORNEY.

United States Patent Office 3,078,009
Patented Feb. 19, 1963

3,078,009
PALLET DISPENSER
Frank L. Irish, De Witt, N.Y., assignor to Lamson Corporation, Syracuse, N.Y., a corporation of New York
Filed Dec. 6, 1960, Ser. No. 74,142
5 Claims. (Cl. 221—297)

This invention has to do with mechanism for dispensing pallets one by one from a stack formation. This mechanism is intended for use in connection with pallet loaders which are machines that function automatically to deposit layers of articles onto a pallet for the convenient handling of the articles, as by a lift truck. A machine of this type is disclosed in Patent No. 2,633,251, issued to J. K. Bruce, March 31, 1953.

The form of pallet most generally used comprises a flat floor of rectangular form secured to spacing rails which, in turn, are mounted upon and secured to a base plate. Ordinarily the rails consist of pieces of 2 x 4 lumber, and the floor plate and base plate are formed of boards nailed to the 2 x 4 rails.

A stack of these pallets is arranged in the automatic pallet loading machine, and provision is made for transferring the lowermost pallet of the stack to a pallet elevator. When the layers of articles have been deposited on the pallet, the loaded pallet is conveyed from the machine and another empty pallet is placed on the pallet elevator. Heretofore, the pallets have been removed from the stack by power operated mechanism involving an expensive and complicated structure.

This invention has as an object a pallet dispensing mechanism embodying a construction in the form of small self-contained units economical to manufacture and which are readily mounted on various types of pallet loaders and which function automatically without any power, or other connection, with the pallet loader.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 is a side elevational view of a pair of pallet dispensing units shown in connection with the contiguous parts of a pallet loader, parts of the lowermost pallet and the next above being broken away and parts thereof shown in section, the mechanism supporting the stack of pallets.

FIGURE 2 is a front elevation of one of the units.

FIGURE 3 is a view taken on line 3—3, FIGURE 2.

FIGURE 4 is a view taken on line 4—4, FIGURE 2.

FIGURE 5 is a view, similar to FIGURE 3, showing the position of the parts when the stack of pallets has been elevated slightly.

FIGURE 6 is a view, similar to FIGURE 5, showing the stack of pallets elevated clear of the dispensing mechanism.

FIGURE 7 is a view illustrating the position of the parts when the stack of pallets is lowered from the position shown in FIGURE 6.

FIGURE 8 is a view, similar to FIGURE 7, showing the stack of pallets lowered to a position where the pallet next above the lowermost pallet is about to engage the supporting arms of the dispensing units.

The invention consists generally of pallet supporting arms mounted in the framework of the machine contiguous to opposite sides of the stack of pallets for supporting the lowermost pallet in the stack. These arms are spring actuated in a direction away from the stack when the lowermost pallet is moved upwardly from the arms. A reset finger is associated with each of the arms for engagement by the lowermost pallet by downward movement thereof. These fingers function when actuated by the downward movement of the lowermost pallet to return the arms in position or engagement by the pallet next above the lowermost pallet. A stack elevator functions to engage the lowermost pallet and move the stack upwardly a distance sufficient to permit withdrawal of the supporting arms, and thence lowers the stack. During this downward movement of the stack, the lowermost pallet engages the reset fingers to return the arms for engagement by the pallet next above, the lowermost pallet continuing downwardly. A latch is provided to latch the arms in pallet engaging position until the next above pallet is resting upon the arms. The released lowermost pallet is lowered to a conveyor which advances the dispensed pallet to the pallet elevator of the pallet loading machine.

The pallet supporting arms and reset fingers may be mounted directly on the framework of the pallet loader. However, the supporting arms and reset fingers are preferably mounted in housings to provide separate self-contained dispensing units, the housings being fixedly mounted on vertically extending side members 10 of the frame of the pallet loader. To each of these side members, there is fixedly secured a housing formed with a back plate 11 apertured to receive bolts 12 extending through the frame members 10. Each housing is formed with side plates 13, 14, fixedly secured to the plate 11. A top plate 15 is fixed to the upper forward edges of the side plates 13, 14, and a cross member 16 extends between the plates 13, 14, adjacent the plate 15.

A bar 20 is fixed to the back plate 11 and extends in spaced parallel relation to the side plate 13 to which it is also connected by a plate 21. The side plate 13 and the bar 20 are apertured to receive a pin 22 on which there is pivotally mounted a lever 25. The pin 22 is held against axial movement by a collar 26 affixed thereto and positioned intermediate the side plate 13 and the lever 25.

The lever 25 is of general T-formation, see FIGURES 1 and 3, and is formed with a laterally extending arm 28. These arms 28 extend under the floor, or upper surface, 29 of the lowermost pallet 31, as shown in FIGURE 1 of the drawings and, in this manner, the arms support the stack of pallets, there being four—31, 32, 33 and 34, shown in FIGURE 1. The arms 28 are maintained in horizontal position by the upper end of the levers 25 engaging the cross pieces 16 of the housings, see FIGURE 3. The levers 25 are urged inwardly by tension springs 36, the upper ends of which are attached to pins 37 mounted in the upper ends of the levers 25, and secured thereto as by lock nuts 38. The lower ends of the springs 36 are secured to pins 40 mounted in the free ends of arms 41. The arms 41 are normally positioned as shown in FIGURES 3 and 4, with the pins 40 inwardly of the vertical plane intercepting the axis of the pin 22. Because of this location of the pin 40, the spring tends to urge the lever 25 in a counterclockwise direction, FIGURE 3.

This movement of the lever 25 is prevented by a latch member 44 of channel formation having side pieces 45 overlying the sides of the arm 28, and extending rearwardly over the sides of the lever 25. These side pieces are pivotally mounted to the lever at their rear ends by a pin 47. The top wall of the latch is bent downwardly and inwardly, as at 48, complemental to the formation of the outer end of the arm 28. The arm 28 is recessed to receive a compression spring 49, which urges the latch member upwardly about its pivot 47, this upward movement being limited by the turned-down forward portion 48 engaging the forward end of the arm 28. A plate 50 is secured to the inner side of the side plate 13, and the adjacent side member 45 of the latch is formed with a projection 51. In the position shown in FIGURE 3, with the latch elevated slightly above the arm 28, the projection 51 engages the lower front end edge of the plate 50 and accordingly, the latch serves to prevent inward motion of the arm 25 by the spring 36. The stop plate 50 is secured to the side plate 13 by studs 56 extending through enlarged apertures 57 in plate 13. This permits adjustment of plate 50 which is clamped in adjusted position by nuts 58 threaded on the studs.

Initially, one or two pallets are manually placed in the machine with the floor 29 of the lowermost pallet 31 positioned on the arms 28. That is, the pallets are arranged with the rails 52 of the pallets extending in parallel spaced apart relation transversely of the stack, and the arms 28 extend between the floor 29 and the base 53 of the lowermost pallet 31. The weight of the pallet moves the latch members 44 downwardly, to move the projections 51 out of engagement with the plates 50. However, the arms 25 will not move inwardly due to the weight of the pallet. A number of pallets are then positioned on top of the first two pallets to form the stack or supply of pallets. Usually the additional pallets are inserted by use of a fork-lift truck.

When a pallet is required by the pallet loading machine, the stack is elevated slightly. This may be brought about by a stack elevator, in the form of a plate 54 mounted on a piston rod 55 connected to a piston operable in the cylinder 56. The plate 54 is elevated into engagement with the base plate 53 of the lowermost pallet, as shown by the dotted line position, FIGURE 1. Further upward movement of the plate 54, by the cylinder and piston structure, effects elevation of the stack, as indicated in FIGURE 5, wherein the stack has been elevated slightly. As the lowermost pallet thus moves upwardly, the arms 25 are moved into the housing by the springs 36 and this movement continues as the pallet raises until the floor 29 of the lowermost pallet 31 moves out of engagement with the arms 28, as indicated in FIGURE 6, whereupon the levers are moved inwardly against the rear wall 11 of the housings by the springs 36. In this position of the levers, the arms 28 are positioned within the housings and out of the vertical path traveled by the pallets in the stack, whereby the stack may be now lowered by the elevator 54. During the downward movement of the lowermost pallet, the levers 25 are moved outwardly to position the arms 28 between the floor 29 and the base 53 of the pallet 32 next above the lowermost pallet 31.

This outward movement of the arms 25 is effected by shifting the pins 40 forwardly of the pins 22. The arms 41 are pivotally mounted on studs 60 secured to the side plates 14 of the housings.

Fingers 61 are pivotally mounted at their inner ends on studs 62, also secured to the side walls 14 of the housings. A spur gear section 63 is also journaled on each stud 62, and is arranged in mesh with a spur gear section 65 fixedly attached to each of the arms 41. A torsion spring 66 is mounted on the studs 60 and functions to urge the arms 41 against an adjustable stop screw 67, carried by a bracket 68 secured to the wall plates 14. Each finger 61 is formed with a projection overlying the adjacent gear section 63. With this arrangement, the fingers 61 are free to move upwardly. Upon downward movement of the fingers, FIGURES 4, 6 and 7, the fingers, through the projections 69, effect clockwise rotation of the gear section 63. With the arms 41 positioned against the stop screws 67, the fingers 61 extend laterally from the housings into the path traveled by the pallets in the stack.

When the stack is elevated by the plate 54, it is only elevated a distance to cause the floor plate 29 of the lowermost pallet to move out of engagement with the arms 28 to permit inward movement of the arms 28, as shown in FIGURE 6. This movement of the stack does not move the base 53 of the lowermost pallet into proximity with the fingers 61.

However, upon downward movement of the stack, the floor plate 29 of the lowermost pallet engages the fingers 61, effecting movement thereof in a clockwise direction, FIGURES 3 to 8, and through the projections 69, gear sections 63, 65, effects forward movement of the arms 41, to position the pins 40 forwardly of the pins 22, whereby the springs 36 now effect forward movement of the levers 25.

As the stack of pallets continues downwardly, the arms 28 are thus moved outwardly between the floor 29 and the base 53 of the next above pallet 32. The lowermost released pallet 31 continues downwardly and is deposited on pallet conveyor chains 70, FIGURE 1, which are actuated to move the released pallet into the pallet loading machine. However, downward movement of the pallet 32 is arrested by the arms 28, which have now been moved into position for engagement by the floor 29 of the pallet 32. The arrangement is such that upon this engagement the base 53 of the pallet 32 has moved out of engagement with the fingers 61, and they are moved to lateral position by the torsion springs 66.

It is apparent that the dispensing units function automatically for the release of the lowermost pallet of the stack without any application of power from the pallet loading machine. These dispensing units are readily attached to the pallet loading machine by simply being bolted to the frame uprights 10, the units being operable for pallets of all dimensions.

What I claim is:

1. Mechanism for dispensing pallets one by one from a vertical stack comprising housings fixedly mounted contiguous to opposite sides of the stack, a lever pivotally mounted at one end in each of said housings, said lever being formed intermediate its ends with an arm extending laterally toward said stack, said lever being movable about said pivot to move said arm into and out of position for engagement by the lowermost pallet in the stack, a spring secured at one end to the free end of said lever and being secured at its opposite end to a member shiftable laterally inwardly and outwardly from said pivot to provide an over-the-center mechanism for moving said lever about its pivot, said spring being operable when said shiftable member is positioned outwardly of said pivot to urge said lever outwardly to position said arm for engagement by the lowermost pallet in said stack, said spring being operable when said shiftable member is positioned inwardly of said pivot to urge said lever inwardly to move said arm out of registration with said stack, a latch carried by said arm and operable to latch said lever against inward movement by said spring, said latch being moved out of latching position by the lowermost pallet supported by said arm, a stack elevator operable to engage the lowermost pallet and move the same upwardly from said arm, and said spring being operable to move said arm inwardly upon such upward movement of said pallet, a finger pivotally mounted in said housing for engagement by said lowermost pallet upon downward movement thereof and being operable upon such downward movement to move said shiftable member outwardly of said pivot.

2. Mechanism for dispensing pallets one by one from a vertical stack comprising pallet supporting arms mounted contiguous to opposite sides of the stack for movement toward and from said stack into and out of position for engagement by the lowermost pallet for supporting the same, a latch operable when said arms are moved in pallet supporting position for engagement by a pallet to latch said arms against movement from the stack out of pallet supporting position, said latch being moved into unlatched position by a pallet positioned on said arms, spring means urging said arms out of pallet supporting position, said unlatched arms being restrained against movement by said spring means by the weight of the pallet positioned on said arms, stack elevating means operable to engage said lowermost pallet positioned on said arms and move the same upwardly from said arms and to thence lower said pallet, said spring means being operable upon upward movement of the pallet to move said arms out of pallet supporting position, and a reset finger associated with each of said arms for engagement by said descending lowermost pallet and operable, upon descent thereof, to return said arms in pallet supporting position for engagement by the pallet next above said lowermost pallet.

3. Mechanism for dispensing pallets one by one from a vertical stack comprising pallet supporting arms mounted contiguous to opposite sides of the stack for movement toward and from said stack into and out of position for engagement by the lowermost pallet for supporting the same, a latch operable when said arms are moved in pallet supporting position for engagement by a pallet to latch said arms against movement from the stack out of pallet supporting position, said latch being moved into unlatched position by a pallet positioned on said arms, spring means urging said arms out of pallet supporting position, said unlatched arms being restrained against movement by said spring means by the weight of the pallet positioned on said arms, stack elevating means operable to engage said lowermost pallet positioned on said arms and move the same upwardly from said arms and to thence lower said pallet, said spring means being operable upon upward movement of the pallet to move said arms out of pallet supporting position, a pivotally mounted reset finger associated with each of said arms for engagement by said descending lowermost pallet and operable upon descent thereof to return said arms in pallet supporting position for engagement by the pallet next above said lowermost pallet.

4. Mechanism for dispensing pallets one by one from a vertical stack comprising housings fixedly mounted contiguous to opposite sides of the stack, an arm mounted in each of said housings for movement toward and from said stack into and out of position for engagement by the lowermost pallet for supporting the same, a latch operable when said arms are moved in pallet supporting position for engagement by a pallet to latch said arms against movement in a direction away from the stack out of pallet supporting position, said latch being movable into unlatched position by a pallet positioned on said arms, spring means urging said arms out of pallet supporting position, said unlatched arms being restrained against movement by said spring means by the weight of the pallet positioned on said arms, a stack elevating means operable to engage said lowermost pallet positioned on said arms and move the same upwardly therefrom and to thence lower said pallet, said spring means being operable upon upward movement of the pallet to move said arms out of pallet supporting position, and a reset finger pivotally mounted in each of said housings and extending laterally therefrom for engagement by said descending lowermost pallet and operable, upon descent thereof, to return said arms in pallet supporting position for engagement by the pallet next above said lowermost pallet.

5. Mechanism for dispensing pallets one by one from a vertical stack comprising housings fixedly mounted contiguous to opposite sides of the stack, a lever pivotally mounted in each of said housings and having a pallet supporting arm, said lever being normally positioned with said arm extending laterally from the housing for supporting the lowermost pallet in said stack, a latch carried by said arm and operable to latch said lever with said arm in pallet supporting position, said latch being moved into unlatched position by a pallet positioned on said arm, spring means urging said lever about its pivot for movement of said arm into said housing out of pallet supporting position, said unlatched lever being restrained against inward movement by said spring means by the weight of the pallet positioned on said arms, a stack elevating means operable to engage said lowermost pallet positioned on said arms and move said pallet upwardly from the arms and to thence lower said pallet, said spring means being operable upon upward movement of the pallet from said arms to move said lever inwardly with said arms out of pallet supporting position, and a reset finger journalled in each of said housings and extending laterally therefrom for engagement by said descending lowermost pallet and operable upon descent thereof to move said lever outwardly about its pivot to position said arm in pallet supporting position for engagement by the pallet next above said lowermost pallet.

References Cited in the file of this patent
UNITED STATES PATENTS

| | | |
|---|---|---|
| 1,330,639 | Leumann | Feb. 10, 1920 |
| 2,024,824 | Knowles | Dec. 17, 1935 |
| 2,858,043 | Fenton et al. | Oct. 28, 1958 |

FOREIGN PATENTS

| | | |
|---|---|---|
| 153,381 | Sweden | Feb. 7, 1956 |